Aug. 18, 1959 W. C. SKAREEN 2,899,837
MECHANISM CONTROL
Original Filed Oct. 19, 1949 2 Sheets-Sheet 1
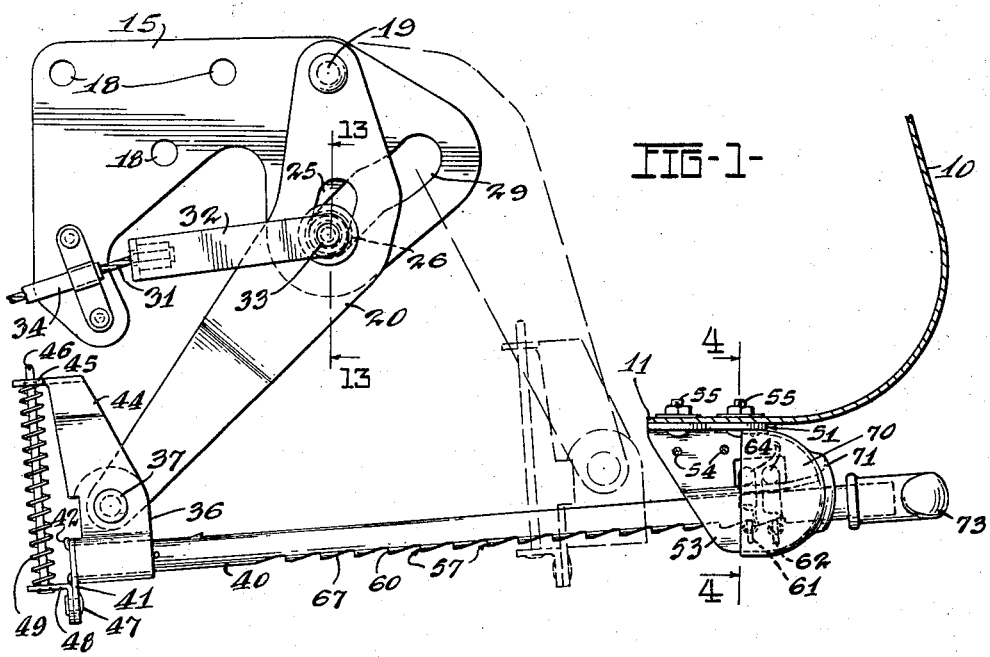
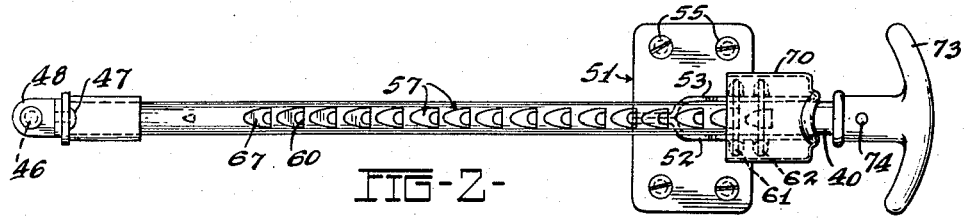
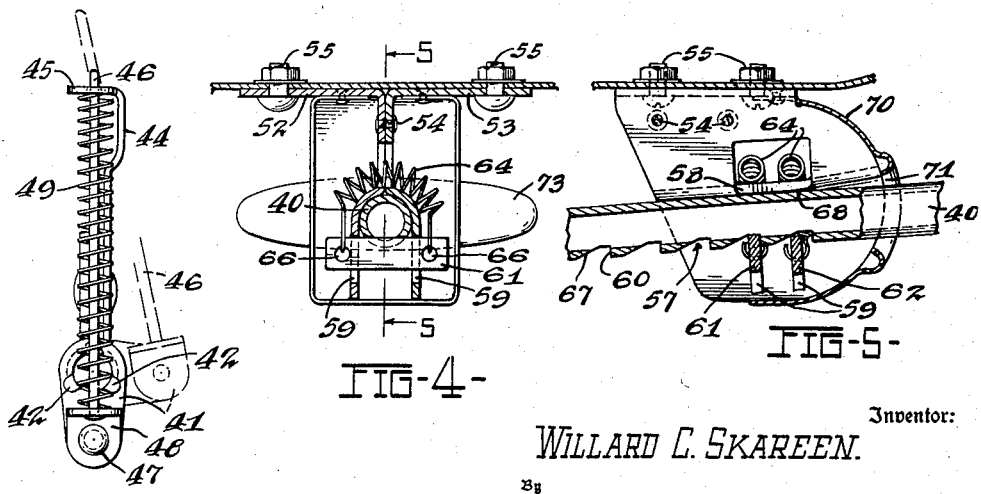
Inventor:
WILLARD C. SKAREEN.
By Harry O. Ernsberger
Attorney Aug. 18, 1959     W. C. SKAREEN     2,899,837
MECHANISM CONTROL
Original Filed Oct. 19, 1949     2 Sheets-Sheet 2
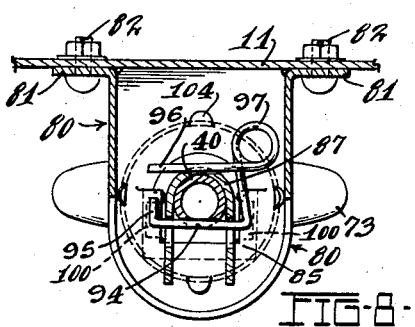
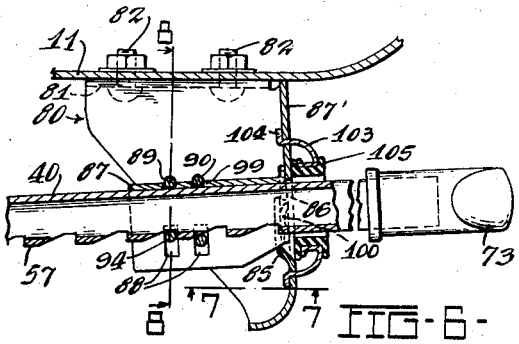
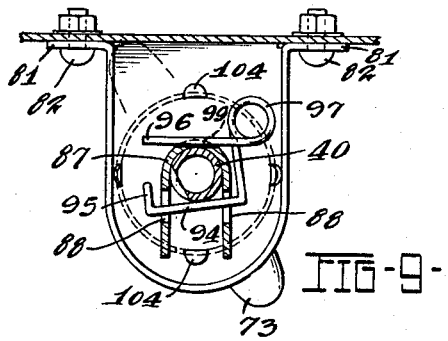
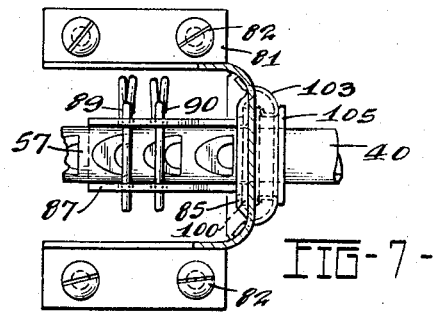
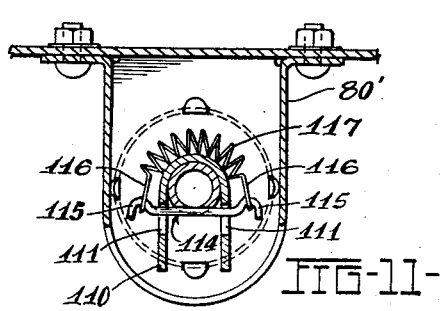
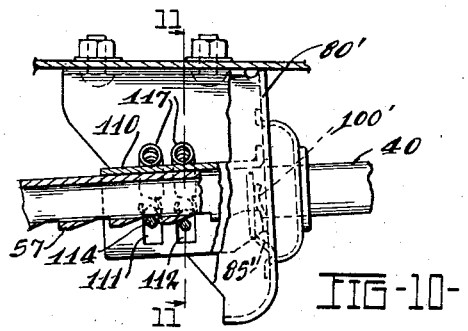
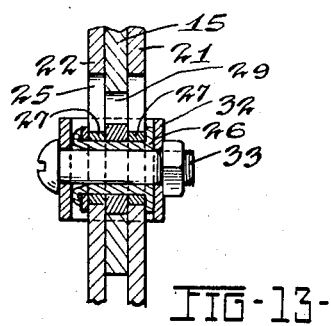
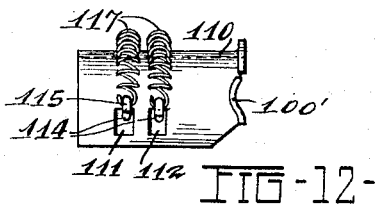
Inventor:
WILLARD C. SKAREEN.
By Harry O. Ernsberger
Attorney

United States Patent Office 2,899,837
Patented Aug. 18, 1959

2,899,837

MECHANISM CONTROL

Willard C. Skareen, Toledo, Ohio, assignor, by mesne assignments, to The Bingham-Herbrand Corporation, a corporation of Ohio Original application October 19, 1949, Serial No. 122,175, now Patent No. 2,716,902, dated September 6, 1955. Divided and this application March 31, 1955, Serial No. 498,369

1 Claim. (Cl. 74—518)

This invention relates to mechanism control and more particularly to apparatus for actuating or controlling brake mechanism of an automotive vehicle and is a division of my copending application, Serial Number 122,-175, filed October 19, 1949, now Patent No. 2,716,902 issued Sept. 6, 1955.

The invention embraces an arrangement of mechanism control incorporating a means constructed and supported for relative movement in a longitudinal direction for actuating mechanism, the actuating means being arranged for relative movement in another direction for effecting the release of mechanism to be controlled.

The invention includes a manipulating means particularly usable for controlling brake mechanism of a vehicle which is arranged to be longitudinally moved to a brake "set" position and which is disposed in a position on the vehicle as to be within convenient reach of the operator.

An object of the invention is the provision of mechanism particularly usable for actuating and controlling the parking brakes of a vehicle, the arrangement embodying a longitudinally movable pull bar or member with which a plurality of pawl members are arranged for cooperation with the pull bar whereby a relatively fine adjustment may be attained to effectively secure the brake mechanism in "set" position.

Another object of the invention resides in the provision of a simple and effective arrangement of multiple pawl means cooperating with a serrated zone of a manipulating member wherein the pawl means are continuously and resiliently urged into engagement with the manipulating member to effectively retain the brake mechanism in "set" position, the manipulating member being rotatable in order to effect disengagement of the pawl means with the serrated zone on the manipulating member.

Another object of the invention resides in a guide arrangement for a brake manipulating member wherein the guide is provided with means accommodating relatively movable pawls which are continuously urged into engagement with the brake manipulating member by resilient means partially circumscribing the manipulating member, the latter being formed with a zone having a plurality of teeth cooperable with the pawls for holding the manipulating means in adjusted positions.

Still another object is the provision of a unitary brake actuating mechanism in which a major number of the components are fabricated of sheet metal so as to enhance the interchangability of elements as well as to effect substantial economies in manufacture and assembly.

Still another object of the invention is the provision of a brake actuating and controlling means embodying a longitudinally movable bar adapted to be held in adjusted positions by means of a plurality of pawls movable in directions substantially normal to the axis of the manipulating member, the arrangement embodying means for normally maintaining the manipulating bar in a position to be operatively engaged and retained by the pawl means in brake "set" positions and which is distortable upon partial rotation of the manipulating bar to effect retractile movement of the manipulating bar.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view showing one form of mechanism control means of the invention;

Figure 2 is a bottom plan view of the arrangement illustrated in Figure 1;

Figure 3 is a view of the forward end of the arrangement shown in Figure 1;

Figure 4 is a vertical sectional view taken substantially on the line 4—4 of Figure 1;

Figure 5 is a vertical sectional view taken substantially on the line 5—5 of Figure 4;

Figure 6 is a vertical sectional view similar to Figure 5 illustrating another form of the invention;

Figure 7 is a bottom plan view of the structure shown in Figure 6;

Figure 8 is a vertical sectional view taken substantially on the line 8—8 of Figure 6 illustrating a pawl element in engagement with a tooth or abutment on the manipulating member;

Figure 9 is a view similar to Figure 8 illustrating the manipulating member in partial rotated position showing the pawl elements disengaged from the toothed or abutment zone of the manipulating member;

Figure 10 is a view similar to Figure 6 showing a modified form of pawl element;

Figure 11 is a vertical sectional view taken substantially on the line 11—11 of Figure 10;

Figure 12 is a side elevational view of bracket construction with which the pawl elements are associated in certain forms of the invention, and Figure 13 is a fragmentary detailed sectional view taken substantially on the line 13—13 of Figure 1.

While the control mechanism of my invention has particular utility for manipulating and controlling brake mechanism and especially the parking brakes of a vehicle, it is to be understood that I contemplate the use of my invention with any mechanism where the same may be found to be applicable.

Referring to the drawings in detail, the embodiments of the invention have been illustrated as particularly adaptable for mounting in the operator's compartment of the vehicle, and in the form of the invention illustrated in Figures 1 through 5 inclusive, numeral 10 designates a vehicle instrument panel which is formed with a flange portion 11. Spaced from the instrument panel in the direction toward the front of the vehicle is a support 15 which is secured to a cowl frame member (not shown) by securing means arranged to be received in openings 18 in the support 15. Pivotally secured to or fulcrumed on the support 15 by means of a pin 19 is a depending lever 20. The lever 20 as illustrated is formed of two plates 21 and 22 (see Figure 13) which are spaced at their upper portions to straddle a uniplanar portion of the support 15. The lever plates are formed with slots 25 through which extend a bushing 26 upon which are mounted spaced rings or rollers 27 disposed within the slots 25. The support 15 is formed with a slot 29 the walls of which provide a guide for the bushing 26 for effecting a varying lever ratio as the mechanism is moved to brake setting position. Means are provided for connecting the lever 20 to the brake mechanism (not shown), said connecting means including a flexible cable 31 coupled with a clevis 32, the latter being connected to the bushing 26 by means of a bolt or stub shaft 33 passing through the opening in the bushing or clevis connecting means 26. As the clevis 32 and cable 31 are moved in a righthand direction as viewed in Figure 1 the walls of the slots 29 cause the bushing 26 to move upwardly or closer to the axis of the fulcrum 19 of the lever 20 shortening the distance between the axis of the clevis or load connection 33 and the axis of the fulcrum 19. This action ensues under the influence of the particular curvature of the slot 29. The function of this arrangement provides for an increasing leverage for operating the brake mechanism as the latter approaches a "set" position so that substantially no increase in power is required applied to the lower end of the lever 20 as the tension of setting the brake mechanism increases. The cable 31 may be enclosed and guided by a suitable tubular sheath 34.

In the embodiment illustrated, there is pivotally connected to the end of the lever 20 a U-shaped member or bracket 36 through the medium of a rivet or pin 37. The bracket 36 is formed with a bight portion of cylindrical configuration arranged to accommodate the end portion of a manipulating member or bar 40 which in the embodiment illustrated, is of tubular configuration. A portion of the member 40 extends through the bracket 36 and receives an arm or finger 41 which is securely held to member 40 by means of ear portions 42 formed integrally on member 40, the ear portions being bent or distorted as shown in Figure 1 to securely hold the arm 41 to the member 40. The bracket 36 is formed with an upwardly extending portion 44 terminating in a flange or ledge 45 through which extends a pin 46. Pivoted to the arm 41 by means of a rivet 47 is an L-shaped member 48 to which the pin 46 is fixedly secured by swaging or other suitable means. As particularly illustrated in Figures 1 and 3, an expansive coil spring 49 surrounds the pin 46 and is disposed between the pivoted bracket 48 and the ledge 45. The purpose of this arrangement is the provision of means to resiliently maintain the manipulating member 40 in one relative position of rotation for purposes to be hereinafter explained. It will be noted particularly from examination of Figure 3 that when the member 40 is rotated through a partial revolution, the arm 41 is also rotated to a dotted position as illustrated in Figure 3. This rotation moves the pin 46 upwardly through the opening in the ledge 45 and relative thereto compressing the spring 49. When turning or rotating force is withdrawn from the member 40, the expansive force of the spring 49 immediately returns the arm 41 and member 40 to an initial position illustrated in the full lines in Figures 1 and 3.

Means are provided cooperating with the tube or member 40 for retaining the brakes or other mechanism with which the arrangement may be connected in an adjusted position. This is accomplished through the cooperation of a pawl element or elements with teeth or abutments formed on the manipulating member 40. Secured to the flange 11 of the instrument panel 10 is a member or bracket 51 which, as shown in the specific embodiment of Figures 1 and 4, is formed of two elements 52 and 53, the intermediate portions of which are joined together as illustrated in Figures 4 and 5 by spot welding 54. The laterally extending portions of the elements 52 and 53 making up the bracket 51 are bolted to the flange 11 by means of bolts 55. Portions of the walls of elements 52 and 53 straddle the bar or member 40 as shown in Figure 4. The manipulating member 40 extends between the wall portions of member 51 and is guided by said walls in a longitudinal direction of movement. The member 40 is preferably of tubular formation and is provided with a plurality of slots or serrations forming a series of spaced teeth or abutments 57 which are arranged in a straight line longitudinally along the member 40. The teeth have vertical faces 60 formed in one direction and inclined faces 67 in the other direction. The wall portions of the bracket or member 51 are provided with one or more slots 59, there being two pairs in the form illustrated, each pair being transversely aligned as illustrated in Figures 4 and 5. Disposed in the pairs of slots 59 respectively are pawl elements 61 and 62. In this form of construction, the pawl elements are of rectangular configuration and extend through the slots and project at either side of the wall portions of bracket 51. The slots 59 are so arranged as to be longitudinally spaced at a lesser distance than the distance between adjacent abutments or teeth 57 on the bar or member 40. In practical embodiments of the invention, the distance between the pawl elements 61 and 62 is substantially equal to one-half the distance between adjacent teeth 57 on the bar 40. By this means a fine adjustment of the member 40 may be accomplished as one of the pawls 61 or 62 is always in a position to engage with the nearest abutment or tooth 57 on the bar. The pawl elements 61 and 62 are continuously urged in a direction toward the member 40 by resilient means such as coil springs 64, the ends of each of the springs extending through openings 66 formed in the pawls 61 and 62 and are articulately connected thereto. This construction is particularly shown in Figure 4. In the form of the invention illustrated in Figures 1 through 5 inclusive, it should be noted that the lever 20 moves in an arc about the axis of the fulcrum 19 as a center. During longitudinal or reciprocal movement of the member 40, the end of the member 40 connected to the lever 20 will also move in a vertical direction thus causing the bar or member 40 to oscillate about the guide portion 58 of the bracket 51. In order to eliminate binding between the bracket 51 and the member 40 it is desirable to form the lower surface 68 of a suitable curvature as indicated in Figure 5 to accommodate the oscillatory movement of the member 40. The bracket 51 is preferably provided with an escutcheon plate 70 having a flanged opening 71 through which the member 40 extends. A suitable grip or manipulating handle 73 is provided on the extremity of bar 40 which may be formed of plastic or other suitable material and is secured to the member 40 by a pin 74 or other suitable securing means.

The operation of this form of my invention is as follows: Figure 1 illustrates the lever 20, the member or bar 40 and associated elements in brake released position. When it is desired to effect a setting of the vehicle brake mechanism, the operator grasps the handle 73 and exerts a longitudinal pull on the bar or member 40 moving the same relative to the bracket 51 and escutcheon 70. When the bar 40 is moved longitudinally in a righthand direction as viewed in Figure 1, the pawls 61 and 62 override the teeth 57 on the member 40 by reason of the inclined surfaces 67. The movement of the member or bar 40 in a righthand direction effects a counterclockwise movement of the lever 20 about its fulcrum 19 and carries with it the bushing 26, clevis 32 and the brake actuating cable 31, these elements being moved by the lever until the brakes are brought to an effectively set position through the connection of the cable 32 with the brakes. As the lever 20 moves in a counterclockwise direction, the distance between the pin 33 joining the clevis to the lever 20 and the pin 19 is shortened due to the configuration of the slot 29 formed in the support 15 so as to increase the leverage effective to operate the brake mechanism. Thus as the brakes approach a position of "set," the bushing 26 is disposed in the upper portion of the slot 25 so that while the cable 31 will be moved a lesser distance in proportion to the longitudinal movement of the member 40, a proportionately greater force will be effective on the cable 31 to set the brakes without increasing the force exerted upon the handle member 73. As the mechanism approaches a position in which the brakes are set, one of the slidably mounted pawls 61 or 62 is in a position to engage against a vertical face 60 of one of the teeth or abutments 57 formed in the member 40 so as to restrain retrograde movement of the member 40 and retain the brakes in a "set" position. It should be noted that during the manipulation of the member 40 in a longitudinal direction to effect a setting of the brakes the member 40 is resiliently retained against rotation in either direction by reason of the expansive pressure of the spring 49 acting against the bracket or member 48 on the arm 41 carried by the member 40. The springs 64 at all times urge the pawls 61 and 62 into engagement with the member 40 so that they are always effective to retain the member 40 in longitudinally adjusted position whenever the teeth 57 are in the path of the slidable pawls 61 and 62.

When it is desired to release the vehicle brake mechanism, the operator again grasps the manipulating handle 73 and rotates the same and the member or bar 40 in either direction through a partial rotation. One of such positions is illustrated in dotted lines in Figure 3 of the drawings. With the member or bar 40 in partially rotated position away from its initial position, the smooth or uninterrupted surface of the bar is then in engagement with the pawls 61 and 62. During rotation of the member 40 the pawls 61 and 62 are caused to ride out of engagement with the teeth 57 as the latter are moved out of alignment with the pawls. The operator, thus having disengaged the teeth 57 on the bar 40 from the pawls 61 and 62, may then move the bar longitudinally of the bracket 51 in a lefthand direction as viewed in Figure 1 thus swinging the lever 20 in a clockwise direction to the position shown in Figure 1, in which position the vehicle brake mechanism will be released. It is to be understood that a single slidable pawl may be used or more than two pawls as illustrated may be used if desired without departing from the scope of the invention.

Another form of my invention is illustrated in Figures 6 through 9 inclusive. In this construction the bar or member 40 is of the same character as illustrated in Figure 1. A member 80 is provided with ear portions 81 which are bolted to the flange 11 of the instrument panel by means of bolts 82. The member 80 is formed with a forwardly extending portion 85 adjacent an opening 86 in a wall 87' of the member. The opening 86 is adapted to receive and accommodate the bar or member 40. Straddling or partially surrounding the bar 40 is a bracket 87, the opposite walls of which are provided with a plurality of slots 88 which are spaced lengthwise of the bracket 87, each pair of slots being adapted to accommodate a pawl element. As illustrated there are two pairs of slots accommodating pawl elements 89 and 90. As particularly illustrated in Figures 8 and 9 each pawl element is inclusive of a transversely extending portion 94 having an upturned end portion 95 and a portion 96 extending across the upper surface of the bracket 87, the portion 96 being connected to the portion 94 by means of a loop configuration 97 which is so formed and the element tempered in fabrication that the portions 94 and 96 are at all times resiliently urged into engagement with diametrically opposite surfaces or zones of the bar 40. The bar 40 is provided with series of teeth 57 which cooperate with the transversely extending portions 94 of the pawl elements for retaining or holding the bar 40 in any position of longitudinal adjustment. The spacing of the pawls 89 and 90 is such that one of the pawls is always in position to engage an adjacent tooth or abutment 57 on the bar 40 in order to retain the bar in adjusted position. The preferred spacing of the pawls is a distance equal to one-half the distance between the vertical faces of adjacent teeth on the bar. It should be noted that in this form of the invention the upper surface of the bracket 87 is formed with recesses or slots 99 in order to properly position the transversely extending portions 96 of the pawl elements. Thus the slots 88 in the side walls of the bracket 87 and the recesses or slots 99 in the upper surface thereof cooperate to maintain the pawls in proper relation in the bracket 87 and relative to the bar 40.

The bracket 87 is secured against longitudinal movement by means of a pair of laterally extending ear portions 100 which engage and rest in the cup-like configuration 85 formed from the forward wall 87' of member 80 as shown in Figure 6. It should be noted that the ear portions 100 are preferably curved to accommodate the vertical oscillatory movement of the bar 40 as it moves longitudinally through the bracket 87. Thus through the interconnection of the ear portions 100 and the portion 85 formed on the forward wall of the member 80, the bracket 87 will remain at all times in engagement with the member 80.

The front wall of the member 80 is formed with an escutcheon 103 secured thereto by means of projections 104 which extend through suitable slots in bracket 80 and are bent during assembly to the positions shown in Figure 6 to hold the escutcheon to the member 80. A suitable grommet 105 formed of rubber or other suitable material is disposed between the escutcheon 103 and the bar 40, the grommet having an opening to accommodate the movement of bar 40 thereto, and serves as an anti-rattling or noise attenuating means. The bar 40 is provided with the manipulating handle 73 in the same manner as shown in the form of the invention illustrated in Figure 1.

The operation of this form of the invention is the same as that in connection with the form of the invention shown and described in Figures 1 through 5 of the drawings.

Figures 10 through 12 inclusive illustrate a further form of the invention which is inclusive of a member 80' formed with an opening to accommodate the bar 40 and is provided with cup-like portions 85' adapted to accommodate ear portions 100' formed upon a bracket or member 110. The side walls of the bracket as illustrated in Figure 12 are formed with pairs of slots 111 and 112, adapted to accommodate transversely extending pawl members 114 preferably in the form of rods or wires, the end portions of which extend through the slots in the walls of bracket 110 and are configurated as shown at 115 in Figure 11 with eyes or loops adapted to accommodate the extremities 116 of coil springs 117. The coil springs 117 extend over the upper surface of the bracket 110 and are of a contractile character so as to at all times resiliently urge the pawl elements 114 into engagement with the bar or member 40. The operation of this form of the invention is substantially the same as the other two forms hereinbefore described. Upon longitudinal movement of the bar or member 40 in a righthand direction, as viewed in Figure 10, one of the pawls 114 engages the nearest tooth 57 formed in the bar 40. The pawl engaging a tooth in the bar serves to retain the latter in adjusted position. When it is desired to release the mechanism with which the bar 40 is connected the bar is rotated in either direction by means of the manipulating handle (not shown) which causes the pawl or pawls 114 to ride out of the serrations between the teeth 57 onto the smooth or uninterrupted surface of the bar 40, after which the bar may be moved in a lefthand direction, as viewed in Figure 10, to release position. The conventional brake mechanism incorporates spring means (not shown) for normally urging the brake mechanism toward released position, and the manipulating means of the present invention are thus normally biased toward release position under the influence of the brake springs.

It is to be understood that any suitable means may be employed in lieu of the spring 49 and associated elements for resiliently maintaining the bar 40 normally against rotation, that is, in an initial position wherein longitudinal movement of the bar without relative rotation will move teeth into cooperative engagement with the pawl elements. It is to be further understood that in some installations the lever 20 and associated mechanism may be dispensed with and the brake actuating cable 31 connected directly to the end of the bar 40. The forms of the invention shown and described herein afford a simple, inexpensive yet satisfactorily effective means for retaining a "pull" type actuator for brake mechanism or other types of mechanism in adjusted position giving a relatively fine adjustment through the use of a plurality of pawls. Furthermore the variable ratio arrangement for increasing the leverage as the tension of setting the brakes increases provides a means facilitating the setting of vehicle brakes without the use of an undue amount of force applied to the manipulating bar.

It is apparent that, within the scope of the invention, modifications and different arrangements may be made other than is herein disclosed, and the present disclosure is illustrative merely, the invention comprehending all variations thereof.

I claim:

Mechanism for controlling the brakes of a vehicle including a support; a lever fulcrumed upon the support; means including a clevis connecting the lever with the vehicle brake mechanism; a cam slot formed in the support; a slot formed in the lever; a roller carried by said clevis and adapted for traverse in said slots, said slots being shaped whereby movement of the lever about its fulcrum toward brake-setting position variably increases the force applied to the clevis means connecting the lever with the braking mechanism; and means connected with the lever for actuating the same to brake setting positions and retaining the lever in said positions.

References Cited in the file of this patent

UNITED STATES PATENTS

| | | |
|---|---|---|
| 1,672,220 | Hughes | June 5, 1928 |
| 2,184,294 | Fergueson | Dec. 26, 1939 |
| 2,240,783 | Jandus | May 6, 1941 |
| 2,304,356 | Heller | Dec. 8, 1942 |
| 2,305,225 | Skareen | Dec. 15, 1942 |
| 2,377,691 | Jandus | June 5, 1945 |
| 2,514,772 | Kramer | July 11, 1950 |
| 2,555,811 | Peterson | June 5, 1951 |
| 2,716,902 | Skareen | Sept. 6, 1955 |